(12) United States Patent
Carmi

(10) Patent No.: US 8,611,699 B2
(45) Date of Patent: Dec. 17, 2013

(54) APPARATUS AND METHOD FOR CHROMA-KEY PROCESSING

(76) Inventor: Shachar Carmi, Tel-Aviv (IL)

( * ) Notice: Subject to any disclaimer, the term of this patent is extended or adjusted under 35 U.S.C. 154(b) by 250 days.

(21) Appl. No.: 13/127,712

(22) PCT Filed: Nov. 5, 2009

(86) PCT No.: PCT/IL2009/001047
§ 371 (c)(1),
(2), (4) Date: May 5, 2011

(87) PCT Pub. No.: WO2010/052716
PCT Pub. Date: May 14, 2010

(65) Prior Publication Data
US 2011/0206279 A1    Aug. 25, 2011

Related U.S. Application Data

(60) Provisional application No. 61/193,205, filed on Nov. 5, 2008.

(51) Int. Cl.
*G06K 9/54*     (2006.01)
(52) U.S. Cl.
USPC ........... 382/300; 382/274; 382/275; 382/282; 358/3.26; 358/3.27; 358/525
(58) Field of Classification Search
USPC ......... 382/274, 275, 278, 282, 300; 358/3.26, 358/3.27, 463, 525
See application file for complete search history.

(56) References Cited

U.S. PATENT DOCUMENTS

| | | |
|---|---|---|
| 5,355,174 A | 10/1994 | Mishima |
| 5,937,104 A | 8/1999 | Henderson et al. |
| 6,011,595 A | 1/2000 | Henderson et al. |
| 6,288,703 B1 | 9/2001 | Berman et al. |
| 6,807,296 B2 | 10/2004 | Mishima |
| 6,996,272 B2 * | 2/2006 | Chen et al. ............ 382/173 |
| 7,269,294 B2 * | 9/2007 | Curry et al. ........... 382/257 |
| 7,317,826 B2 * | 1/2008 | Wilensky et al. ...... 382/162 |
| 7,342,572 B2 * | 3/2008 | Zhang et al. .......... 345/173 |
| 7,492,957 B1 * | 2/2009 | Bonhaus et al. ....... 382/245 |

(Continued)

FOREIGN PATENT DOCUMENTS

| | | |
|---|---|---|
| EP | 1063840 | 12/2000 |
| WO | WO 2010/052716 | 5/2010 |

OTHER PUBLICATIONS

International Preliminary Report on Patentability Dated May 19, 2011 From the International Bureau of WIPO Re. Application No. PCT/IL2009/001047.

(Continued)

*Primary Examiner* — Yosef Kassa

(57) ABSTRACT

Apparatus for interpolating or dispersing effects over a video frame, useful for chroma keying of an image comprising a foreground including a part to remove, such as a background or spill from the background. The apparatus handles pixels of the image one by one and includes an interpolation unit for applying an interpolation of attributes at a respective pixel and then applies a function based on the attributes. For example in chroma keying an opaqueness assigner may compare the local color with a color of the part to remove using the interpolation. Based on the comparison, keying is used to set at the respective pixel a level of opaqueness for the pixel.

15 Claims, 7 Drawing Sheets

(56) References Cited

U.S. PATENT DOCUMENTS

| | | | |
|---|---|---|---|
| 7,792,361 B2* | 9/2010 | Wilensky et al. | 382/173 |
| 7,853,074 B2* | 12/2010 | Mischler | 382/163 |
| 7,876,320 B2* | 1/2011 | Marugame | 345/420 |
| 7,889,941 B2* | 2/2011 | Piovano et al. | 382/260 |
| 7,990,389 B2* | 8/2011 | Barone | 345/475 |
| 8,027,531 B2* | 9/2011 | Wilburn et al. | 382/154 |
| 2001/0028735 A1 | 10/2001 | Pettigrew et al. | |
| 2005/0212820 A1 | 9/2005 | Liu et al. | |
| 2007/0035561 A1 | 2/2007 | Bachelder et al. | |
| 2008/0117333 A1 | 5/2008 | Walsh | |

OTHER PUBLICATIONS

Communication Relating to the Results of the Partial International Search Dated Feb. 8, 2010 From the International Searching Authority Re.: Application No. PCT/IL2009/001047.

International Search Report and the Written Opinion Dated May 3, 2010 From the International Searching Authority Re.: Application No. PCT/IL2009/001047.

Ultimatte Corporation Ultimatte Overview: "Understanding The Ultimatte Process So You Can Achieve Perfect Composites Before Your Coffee Gets Cold!", chapter 1-3, pp. 1-55, 1996.

\* cited by examiner

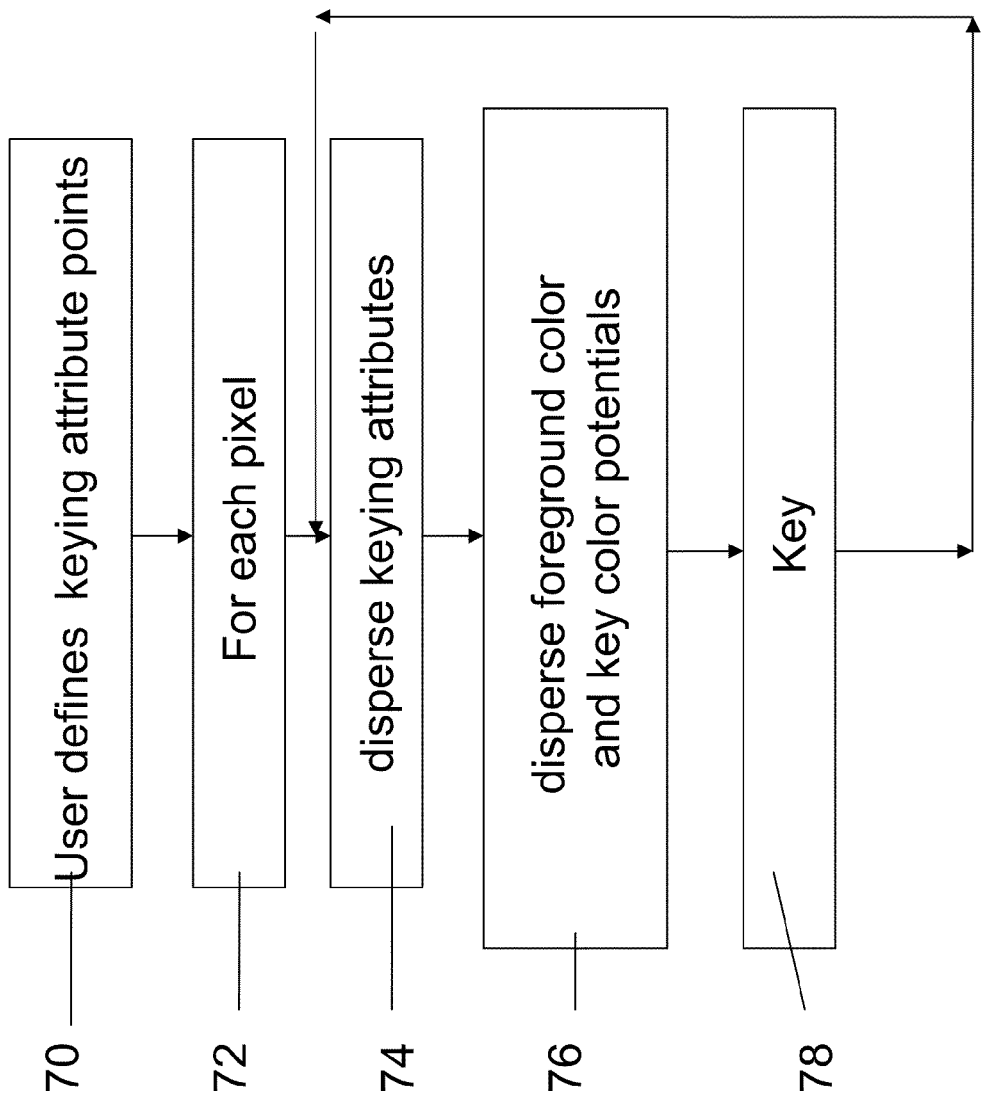

APPARATUS AND METHOD FOR CHROMA-KEY PROCESSING

RELATED APPLICATIONS

This application is a National Phase of PCT Patent Application No. PCT/IL2009/001047 having International filing date of Nov. 5, 2009, which claims the benefit of priority of U.S. Provisional Patent Application No. 61/193,205 filed on Nov. 5, 2008. The contents of the above applications are all incorporated herein by reference.

FIELD AND BACKGROUND OF THE INVENTION

The present invention, in some embodiments thereof, relates to apparatus and a method for chroma-key processing and, more particularly, but not exclusively, to digital chroma-key processing in a manner which is more resilient to impure background colors.

Chroma key is a technique for mixing two images or frames together, in which a color (or a small color range) from one image is removed (or made transparent), revealing another image behind it. This technique is also referred to as color keying, colour-separation overlay (CSO), greenscreen, and bluescreen. Blue and green are popular colors since they are considered the colors least like skin tone, thus not running the risk of losing the actor. This technique is widely used in the entertainment industry and in weather forecasting.

Prior to the digital era and the introduction of digital compositing, the process was a complex and time consuming one known as "travelling matte". The credit for development of the bluescreen is given to Larry Butler, who invented the blue screen and traveling matte technique in order to achieve visual effects which were unprecedented in 1940.

In 1950, Arthur Widmer began working on an ultra violet traveling matte process. He also began developing bluescreen techniques.

In the technique the background footage was shot first and the actor or model was filmed against a bluescreen carrying out their actions. Simply placing the foreground shot over the background shot was seen not to be sufficient as this merely created a ghostly image over a blue-tinged background. The actor or model had to be separated from the background and placed into a specially-made hole in the background footage. In order to achieve this, the bluescreen shot was first rephotographed through a blue filter so that only the background was exposed. A special film was used that created a black and white negative image—a black background with a subject-shaped hole in the middle. This was called a female matte. The bluescreen shot was then rephotographed, this time through a red and green filter so that only the foreground image was cast on film, creating a black silhouette on an unexposed (clear) background. This was called a male matte.

The background image was then rephotographed through the male matte, and the shot rephotographed through the female matte. An optical printer with two projectors, a film camera and a 'beam splitter' combined the images together one frame at a time. This part of the process had to be very carefully controlled to ensure the absence of black lines. During the 1980s, minicomputers were used to control the optical printer. In one case a quad optical printer was used which accelerated the process considerably.

One drawback to the traditional traveling matte is that the cameras shooting the images to be composited cannot be easily synchronized. For decades, such matte shots had to be done locked-down so that neither the matted subject nor the background would move at all. Later, computer-timed motion control cameras alleviated this problem, as both the foreground and background could be filmed with the same camera moves.

The process was later digitized, and optical filters were replaced with computer programs that worked on the color encoding of individual pixels in a digital image. Computer development also made it easier to incorporate motion into composited shots, even when using handheld cameras. Reference-points can be placed onto the colored background (usually as a painted grid, X's marked with tape, or equally spaced tennis balls attached to the wall). In post-production, a computer can use the references to adjust the position of the background, making it match the movement of the foreground perfectly. Modern advances in software and computational power have even eliminated the need to use grids or tracking marks—the software analyzes the relative motion of colored pixels against other colored pixels and solves the motion to create a camera motion algorithm which can be used in compositing software to match the motion of composited elements to a moving background plate.

One computerized technique, the travelling Matte technique, allows the computer to identify pixels that belong to the background. In a digital pixel, color is represented by a triple of numbers, typically red, green, blue. The technique exploits the fact that most objects in real-world scenes have a color whose blue color component is similar in intensity to their green color component. Thus a background where either blue or green is highly prominent can easily be recognized and removed.

A development of traveling matte, the chroma key technique, also makes it possible to add backgrounds that are constructed entirely using computer-generated imagery (CGI). Performances from different takes can even be composited together, which allows actors to be filmed separately and then placed together in the same scene. Chroma key allows performers to appear to be in any location without even leaving the studio. Chroma key is achieved by a simple numerical comparison between the color at a given video pixel and the preselected background color. If the color at a particular point on the screen matches, either exactly, or in a range, then the current pixel, presumed to be background is rendered transparent, and a pixel is introduced from the alternate background video.

More specifically, the dominant color component of the pixel is identified. If the dominant component is that selected as the background, then a potential is calculated from the difference between the dominant component and the second component. The pixel is then set at a level between opaque and transparent depending on the potential.

An issue with all of the above techniques is that if the foreground object was filmed close to the backing screen or with less than ideal lighting conditions, the foreground object will usually have what is known as spill, somewhere on it. This is most common when filming blonde people against a blue or green screen as their translucent hair absorbs the backing screen color. A comprehensive Matte system should be able to remove such spill and replace to achieve a realistic result. Failure to deal with spill leads to a color halo at the boundary of the two images, giving away the technique. Such a color halo is particularly recognizable as a giveaway in pre-digital matte work.

U.S. Pat. No. 5,355,174 to Mishima discloses a method of color space segmentation that can help a user achieve maximum effectiveness with a matte tool. Mishima segments all the colors in the foreground image into one of four separate categories. The result is a 'spill suppressed' foreground image and a matte which is used to apply the modified foreground to a suitable background.

Mishima's tool works in 3D RGB color space.

The prior art as described requires a uniform or substantially uniform background, preferably of a pure predefined color with particular properties. However this is not always available. Even if such a background is available, variations in lighting may lead to inaccuracies in hue detection, leading to inaccuracies in creating the matte.

To summarize the issue, chroma key footage tends to be impure. Pure blue or pure green are rarely achieved. Rather, in most cases the chroma screen will somewhat deviate towards cyan, magenta or yellow. This often creates a problem as most keying algorithms compare the pixel color to one of the pure colors, thus given an image with a blue screen that leans somewhat towards magenta causes the result to have lost some of its potential because of the difference between the pure blue and the deviation.

Chroma key footage also tends to be non-uniform in the sense that the chroma screen color changes gradually across the frame because of varying distance from the lights, or the object having areas that absorb the incident light differently. An example is an actor wearing a white shirt and black pants. The incident light includes tinting from the chroma screen on the white shirt but not on the back pants. The pants are therefore more easily distinguished from the background than the shirt.

All keying systems process the input image using two attributes:

1) key color, which is the color each pixel in the image is to be compared to, in order to determine whether it should be set as opaque or transparent.

2) range settings, which include the high and low pass, or tolerance and softness. These, in general, tell us how large a difference from the key color we still consider as background to be set as transparent. This allows one to cover all the different conditions in the frame.

Some keyers also deal with spill suppression and therefore have settings for that as well. The key color, range settings and spill settings are all referred to as "keying attributes".

All existing keying systems use fixed keying attribute values for all the pixels in the input image. These values may vary over time, but any single frame is processed entirely using the same attributes for all pixels.

The problem with having fixed values is that since most chroma key footage shows non-uniform conditions across the image, no one set of attributes will yield optimal results throughout the frame. In reality, different parts of the chroma screen and different parts of the object require a different set of optimal keying attributes.

While compositors can use separate keyers and then gradually blend the separate results, there is no practical number of such operations that will give optimal results, as any two treated areas that differ in needed 'keying attributes' will leave a middle area that is a blend of the keying of two mismatched 'keying attributes' Looked at in more detail, we consider two points.

One area needs a value of 100 and the other needs a value of 150 to yield optimal results. Using the technique of this variation the point would get one result from an input value of 100, which mismatches it's optimal value by 25, and another result from an input value of 150, which again, mismatches by 25, and then blend the two bad results, into a poorly solved pixel.

To solve the problem of this pixel the user would have to add a third keyer in the middle and give it a value of 125. and again, he would have a problem between that new point and the two previous points.

In fact any such subdivision could proceed until every numeric step has been manually dealt with, which is impossible to do.

SUMMARY OF THE INVENTION

The present embodiments note that variations in background color can be quite large but that they tend to be gradual. Also the color potentials themselves can vary between color schemes. Thus the keying operation is carried out on interpolations of the keying attributes or color potentials. In one embodiment there is taught the feature of spatial interpolation of the keying attributes, that is interpolating the keying attributes over the image between manually selected points on the image. As explained, certain points on the image are selected by the user and at every given point keying attribute values for keying operations are calculated by interpolation from the selected points.

The present embodiments are however not limited to a single color background with gradual changes. Suitable selection of reference points allows for changes in color to be accommodated, and for regions of different but still relatively uniform colors to both be treated as background, as long as there is a discontinuity in color between the background to be removed and the object part to be retained.

Interpolation may also be between different coloring schemes so that a color that gives a high potential in one coloring scheme but not in another can still be recognized as having a high potential, as will be explained in greater detail below.

In the following the term "foreground" when unqualified refers to the image as received. The part to be retained is referred to as the foreground object or object to be retained. The background is the part of the image as received which is intended for removal, and may be referred to as the key color or local key color or interpolated key color. The term "background" where unqualified may also refer to the chroma screen in the input image. Thus the background as referred to herein includes the concept of that part of the foreground that is removed after successful identification.

According to an aspect of some embodiments of the present invention there is provided apparatus for processing of an image, the apparatus comprising:

a pixel input configured for handling pixels of said image, the pixel defining a local property;

a reference input configured for user interactive definition of reference points;

an interpolation unit associated with said pixel input, configured for applying an interpolation of attributes at a respective pixel based on said reference points; and a property assigner configured to compare a local property with said interpolation to apply a function to said local pixel based on said comparison using the said interpolated attributes, thereby to modify said local pixel.

In an embodiment, said function is keying, said image comprising a foreground, said foreground comprising an object and a surrounding part to be removed, said reference points being sample points of said background to be removed and said function comprising assigning a level of opaqueness to said local pixel based on said comparison, thereby to remove the part from the image.

In an embodiment, the part to remove is a chroma background part.

In an embodiment, said interpolation comprises interpolation of said part to remove, said local color being compared with said interpolation in said keying operation to set said opaqueness.

In an embodiment, said reference input comprises a user setting unit for allowing a user to define said part to remove by identifying points thereon, said interpolation comprising providing a local set of keying attributes to correspond to said respective pixel, said local background color being an interpolation obtained from the colors at the identified points by weighting of their distances to said respective pixel.

In an embodiment, said interpolation further comprises an interpolation between first and second color potentials of each of said local color and a local background color defined by said interpolation between reference points, each of said first and second color potentials calculated for a respective color encoding scheme, said interpolation of color potentials being provided to said opaqueness assigner for said keying operation.

The apparatus may be configured with a color potential calculation unit to calculate the second color potential from the color values of the first color encoding scheme.

In an embodiment, said first color encoding scheme is the red, green blue (RGB) color scheme, and said second color encoding scheme is the cyan magenta yellow (CMY) color encoding scheme.

In an embodiment, said interpolation comprises an interpolation between first and second color potentials of each of said local color and a local background color defined by said interpolation between said reference points, each color potential calculated for a respective color encoding scheme, said interpolation of color potentials being provided to said opaqueness assigner for said comparison.

This embodiment as well, may be configured with a color potential calculation unit, wherein the second color potential is calculated from the color values of the first color encoding scheme, thereby obviating a need to convert color values between said first and said second color encoding schemes.

According to a second aspect of the present invention there is provided a method for chroma keying of an image comprising a foreground, the foreground including a part to remove, the method comprising:

obtaining individual pixels of said image, said pixels each defining a local color;

applying an interpolation at a respective pixel;

comparing the local color with the part to remove, using the interpolation, and assigning to the respective pixel a level of opaqueness based on said comparison, thereby to remove the part.

According to a third aspect of the present invention there is provided apparatus for chroma keying of an image comprising a foreground, the foreground including a part to remove, the chroma keying being achieved pixelwise by alteration of pixel properties, the apparatus comprising:

a pixel input configured for handling pixels of said image, the pixel defining a local property;

an interpolation unit associated with said pixel input, configured for applying an interpolation at a respective pixel; and a property assigner configured to compare the local property with a property of the part to remove using the interpolation, and to set at the respective pixel a level of said property based on said comparison in a keying operation, thereby to remove the part from the image.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 6 is a simplified diagram showing combined background key color interpolation and double keying in an overall process according to an embodiment of the present invention.

DESCRIPTION OF EMBODIMENTS OF THE INVENTION

Figure 1:
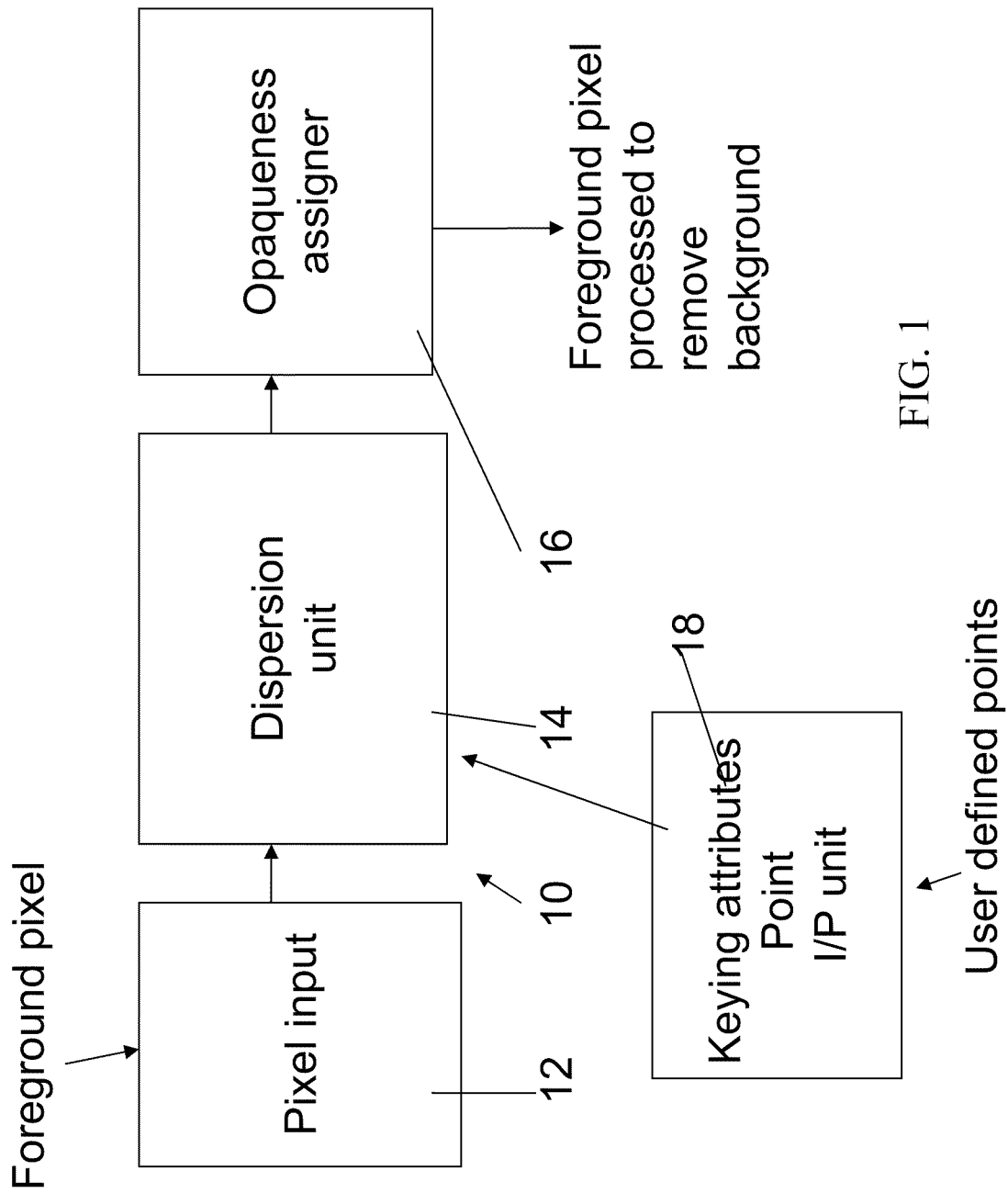
FIG. 1 is a simplified drawing showing a generalized apparatus according to a first embodiment of the present invention.

The present invention, in some embodiments thereof, relates to improved chroma-key processing of images and, more particularly, but not exclusively, to chroma-keying based on interpolation at the local pixel.

In order deal with the non-uniformity issue referred to in the background, the present embodiments allow the user to set any number of values for any of the keying attributes, wherein these values relate to specific points in the frame. Then a dispersion, or interpolation, algorithm assigns every pixel in the frame its own unique set of keying attributes based on the gradual change of each pixel's weighted proximity to the user-set-points in the frame. The result allows each pixel to be processed according to its own optimal set of keying attributes.

To deal with the impurity of the screen color, the present embodiments may carry out two keying operations using complementary color spaces (RGB and CMY) and mix the results according to the current pixel's 'key color' position between pure RGB and pure CMY.

For example, say the current pixel's 'key color' is a blue color, that deviates 30% towards magenta.

In prior art keying systems this would mean a 30% loss in potential. This is because, if an object was shot against say an azure background, the object would have the largest numeric difference from that color, and not the closest pure component, blue.

However, in the present embodiments, the keying system measures the current pixel's differences from both pure blue and pure magenta, and mixes the two results in respect to the "key color's" deviation.

The result is a key process that is unaffected by the impurity of the 'key color'.

The prior art systems as explained generally use color values based on a single color encoding system, and fixed thresholds. But fixed thresholds are not appropriate where say an image background changes gradually in hue as one moves towards or away from a light source. Furthermore, there are other reasons to interpolate. for instance, if the object is partly similar in color to the image background, we would want to tighten the keying range settings over that region.

Interpolation at the local pixel allows amongst other things for gradual changes in background hue of the image, or for that matter any other background properties. A pixel of a certain color or other property can be read in one way at one part of the background because it exceeds the local range settings, whereas a pixel of identical color can be read differently elsewhere in the background as it answers to a different set of keying attributes.

That is to say the present embodiments allow for gradually changing properties over the image background. By contrast the prior art looks for absolute values of the properties, accommodating gradual change merely by having the different image pixels drift in and out of the fixed keying range settings.

Furthermore, the interpolation may in one embodiment comprise interpolation between different color schemes when calculating a color potential. Interpolation between color schemes allows for greater robustness when recognizing the background color, and therefore allows for a greater range of background colors to be used.

That is to say, gradation in the background is difficult to handle without the use of double keying, or for that matter multi-keying of the kind described hereinbelow. Prior art keying systems using RGB keying would not be able to transition smoothly from colors that have a different dominant component.

Let us say that pixel p1 has blue as a dominant component, and pixel p2 has a green dominant component. Now, as the color changes from p1 to p2 the dominant component changes from blue to green. The more the two are closer to equality the less keying potential we have (potential=dominant−second). This means that keying goes poorer as the two colors mix until they are equal, where no keying can occur as the potential is 0. Thus, spatial change of the key color alone is unhelpful in many cases without the sequential capabilities of the double keying method.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a simplified block diagram which illustrates apparatus for chroma keying of an image. The initially input image is regarded as a foreground, and there is a background color, or key color which it is desired to remove. The apparatus 10 includes a pixel input 12 which handles individual pixels of the image. Each pixel defines a local color, generally in red green blue (RGB) format.

Interpolation unit 14 is connected downstream of the pixel input, and applies an interpolation at the respective pixel. The interpolation may be of the image background as will be explained in greater detail below, to arrive at a local set of keying attributes. Alternatively or additionally the interpolation the interpolation between keying attributes as above and between color potentials, or other properties. The foreground color has two different color potentials calculated, one worked out, say according to the RGB format and a second color potential worked out according to another color coordinate scheme such as CMY. The same is done for the background color and keying ratios between foreground and background are calculated for each color scheme. More particularly the color is interpolated spatially in only one color space (usually RGB). The second color space is then used at the stage of the keying algorithm, as will be explained in greater detail below, based on the already spatially interpolated color. The interpolation between the two color spaces is not spatial, but rather is an operation carried out for individual pixels being keyed at the moment. It is noted that the RGB and CMY color spaces are complementary. Then a switch or interpolation value is calculated for the local key color based on the key color deviation from RGB to CMY and this is used to calculate an overall or double key value based on an interpolation between the two keys.

Opaqueness assigner 16 thus compares the local pixel or foreground color with that expected by the spatially interpolated key color and arrives at the key ratio. The key ratio uses one or both of the spatial and color space interpolations. Keying then proceeds as normal in that the opaqueness assigner then assigns to the respective pixel a level of opaqueness based on the comparison. The opacity level of that pixel is determined by it's respective value within the range definitions, defined in the spatially interpolated keying attributes. Thus the background part as identified by the keying operation is removed from the input image or foreground, or the spill is removed from the object.

In an embodiment the interpolation comprises an interpolation of a color obtained from a user defined background.

The background color may be defined by the user simply by identifying a number of points in the image which he regards as background. For this purpose there is provided a 'keying attribute' point input unit 18 for allowing the user to define any attribute points and associated values. The interpolation then takes the current pixel and provides a key color to correspond to the pixel, by obtaining an interpolation from the colors at the surrounding background points weighted by their distances to the pixel. Thus a locally expected key color is calculated which is an interpolation of the user defined points, and the current pixel is identified as background or not in terms of its closeness or otherwise to the local interpolation of the key color and not against an fixed value. A range setting may be used to define whether the local color is close enough to the interpolated key color, but again the key color and range settings are the local interpolation of the keying attributes and not any fixed value.

As mentioned, in an embodiment the interpolation further comprises an interpolation between different color potentials of the local color. The color potential in any given coding scheme comprises a difference between the strongest color and the second color in the given coding scheme. Thus in the RGB color scheme, if the strongest color is red, and the second and third colors are green and blue respectively, then the color potential is red−green.

As above, the CMY color values do not need to be actually worked out. Rather use was made of the fact that RGB and CMY are complementary, so that the second color potential may be calculated directly from the color values of the first color encoding scheme, thereby obviating a need to convert color values between the first and second color encoding schemes. RGB and CMY are examples of two such complementary schemes, and the CMY color potential can be obtained directly from the RGB color values, as will be shown below.

Figure 2A:
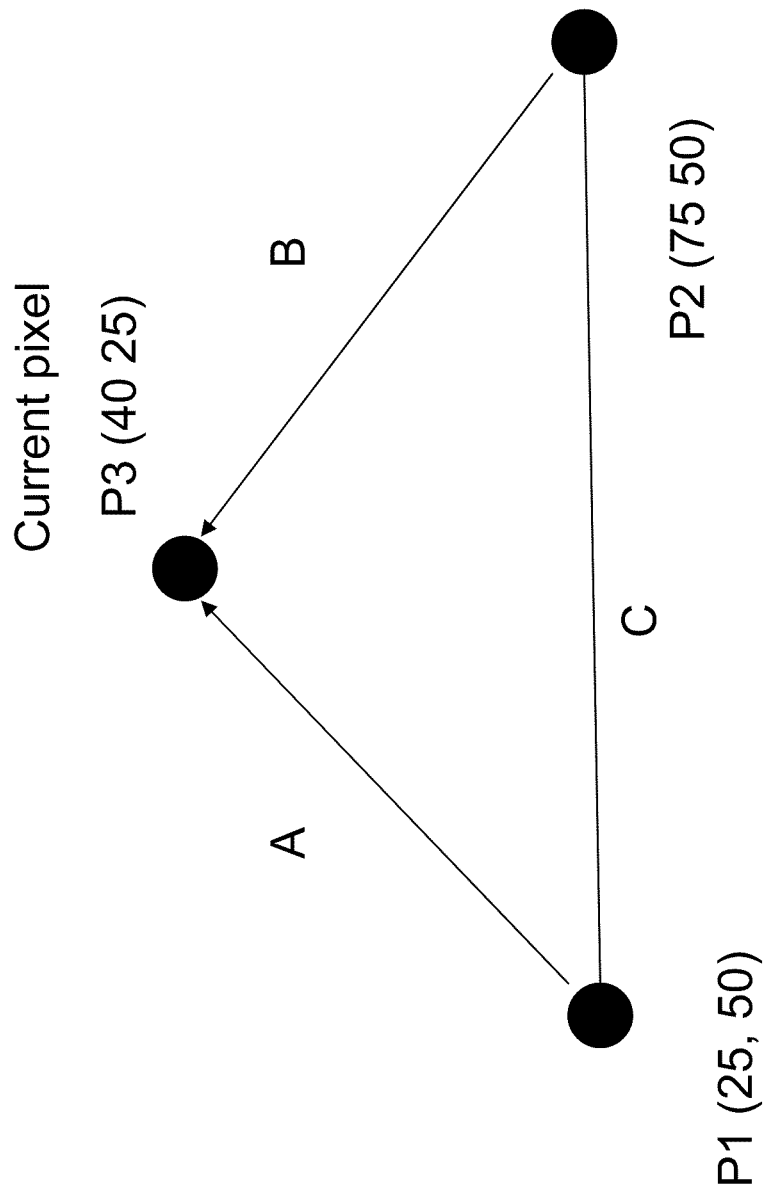
FIGS. 2A and 2B are simplified drawings showing schematically a color interpolation of a current point based on two user defined points, according to an embodiment of the present invention.

Reference is now made to FIG. 2A, which is a simplified diagram showing how a pixel can be supplied with an interpolation color based on user selected points.

In the following example we will show how one 'keying attribute', namely the 'key color', is interpolated. The user has selected two points P1 and P2 which he regards as representative of the chroma screen background. However P1 and P2 are not exactly the same color. The current pixel being processed is P3, and the system needs to decide whether P3 is part of the background to be removed and should be made transparent or is part of the foreground object and should be left untouched. The question is what background color should it be compared to, that of P1 or that of P2? The answer given by the present embodiments is to compare it to an interpolation between the two based on weightings associated with their relative distances. In this case P3 is closer to P1 than P2 so it should be assigned a color on a linear scale between P1 and P2 but proportionally closer to P1.

In the case of FIG. 2A let us say that the blue intensity at P1 is 100, and the blue intensity at P2 is 150. Note also that in this simplified example P1 and P2 are collinear so that there is only one dimension to consider, but the formula is the same. The blue intensity at P3 is $$P1.(A-B+C)/C+P2.(B-A+C)/C=100.(50-15)/50+150(50-35)/50=70+45=115.$$

The above formula is of course highly simplified in that it considers points lining up in order along a single dimension.

Figure 2B:
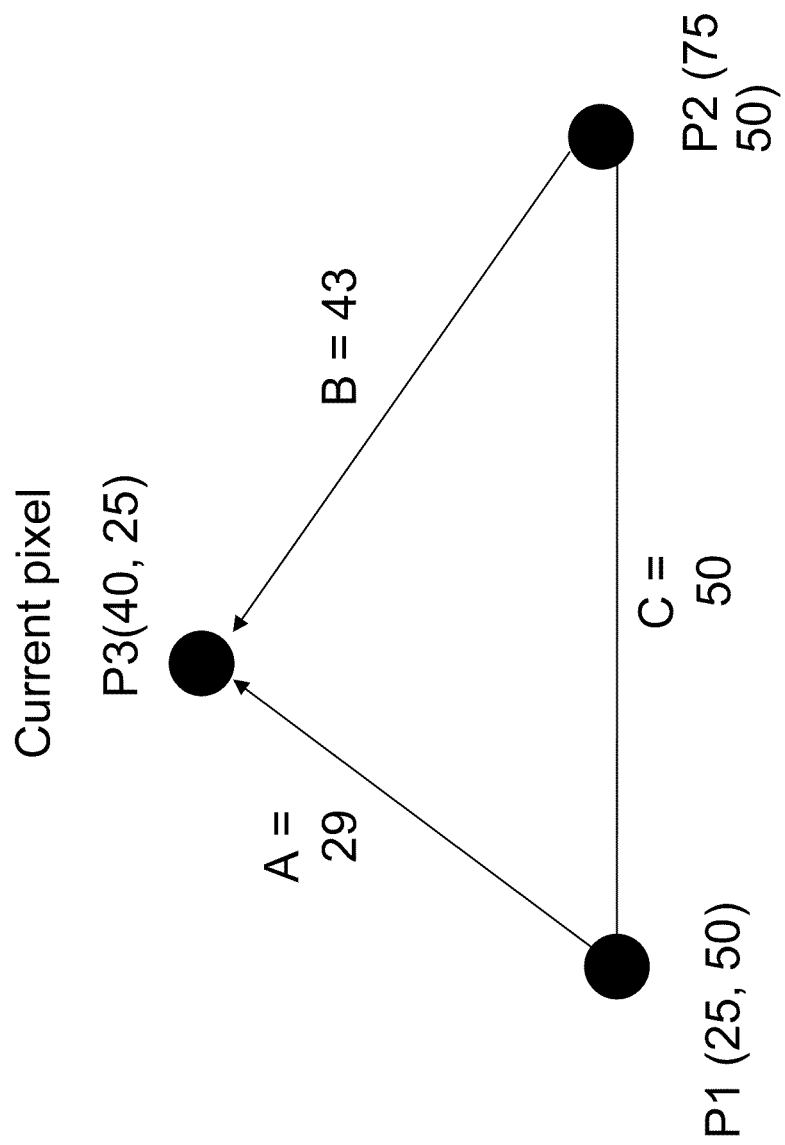

An alternative and more realistic but still simplified formula, in which the values of A, B and C were obtained using Pythagoras theorem is as follows, with reference to FIG. 2B:

$$D1=(B-A)/C+1$$

$$D2=(A-B)/C+1$$

$$SUM=D1+D2$$

$$(P1*D1+P2*D2)/SUM=(100*1.28+150*0.72)/2=118$$

The result of this formula: (B−A)/C+1, may be referred to as a raw influence.

As seen P3 is more strongly influenced by P1 than P2 since it is closer to P1.

The influence of each user selected point is thus of the form intensity X ratio, where the ratio is the raw influence to the current point divided by the sum of raw influences of all relevant points at that pixel. By relevant is meant all those user-defined points that carry a value for this attribute, or group of attributes. Let us refer to this ratio as the weighted influence.

For each additional user selected point there is simply an additional intensity multiplied by the relevant influence ratio. Thus for four user selected points having intensities P1 . . . P4, the background interpolation at the current pixel would be $$P1.\text{inf}1+P2.\text{inf}2+P3.\text{inf}3+P4.\text{inf}4.$$

Given three points, a first having a blue intensity of 100 and an influence of 0.6, the second having a blue intensity of 150 and an influence of 0.3, and the third having a blue intensity of 80 and an influence of 0.1 (because it is the furthest away) the local background interpolation would be:

$$100\times0.6+150\times0.3+80\times0.1=113$$

Once the local background color has been obtained by interpolation, then keying can be carried out on the basis of the interpolated color. Thus the local foreground color may be compared with a blue intensity of 113 and not with either 100 or 150.

The interpolation of color intensities is typically carried out together for different color values in the color space although it may be carried out separately for each intensity etc where other attributes are involved.

That is to say some attributes belong together, say red green and blue which together define a local color that describes the background, tend to interpolate in the same way between the same points. On the other hand low and high keying threshold values interpolate using other points. This is because color sample points describe the background, so they are located at places that best fit the background, while key controls points care more for the object. Therefore, they are usually placed at different positions of interest. In other words, attributes may interpolate grouped together between points common to them, or they may interpolate separately between their attribute-specific points.

Figure 3:
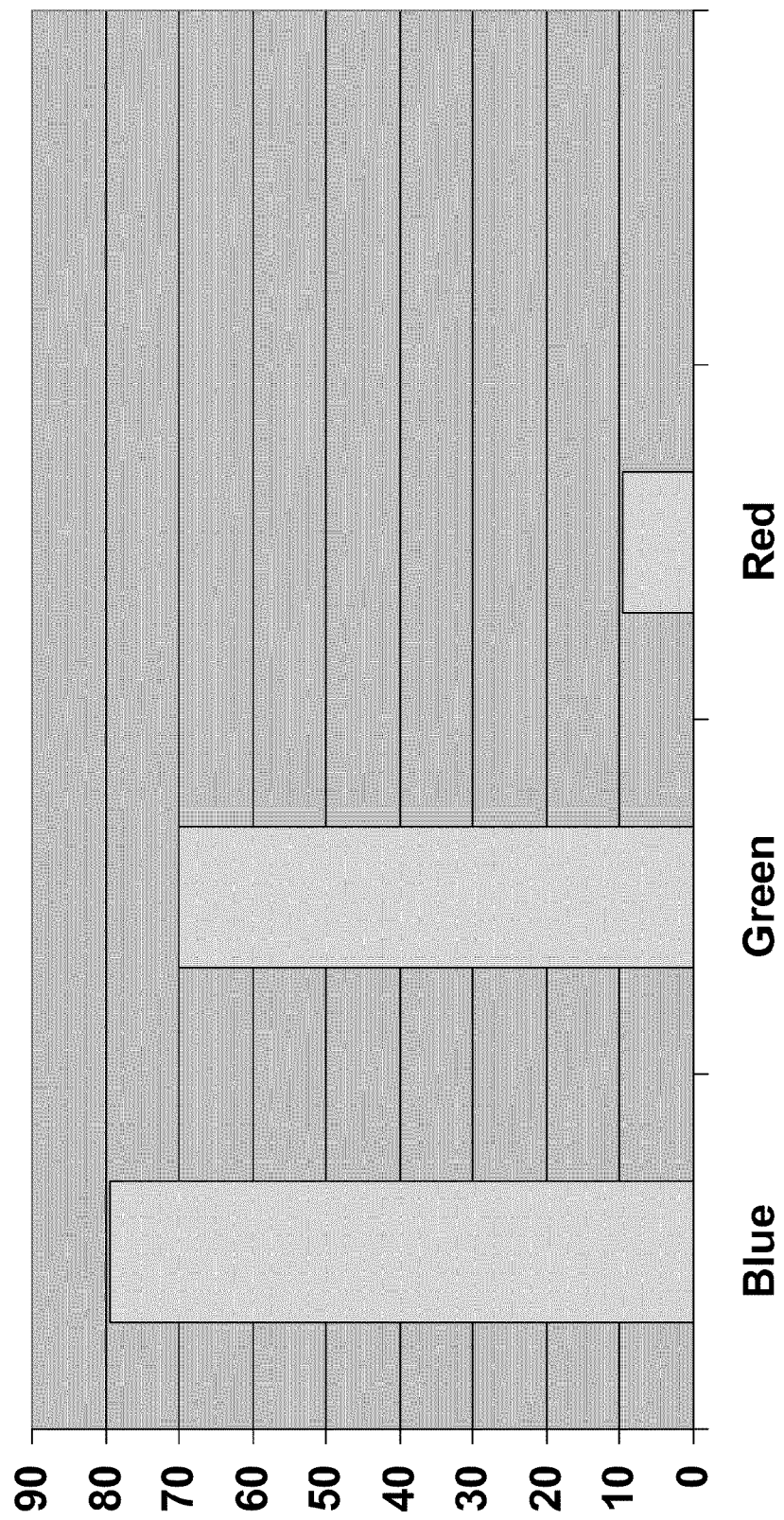
FIG. 3 is a graph showing color intensities of a pixel according to the RGB color scheme, to illustrate how a color can have a low color potential in one color scheme but a high color potential in another color scheme.
Figure 4:
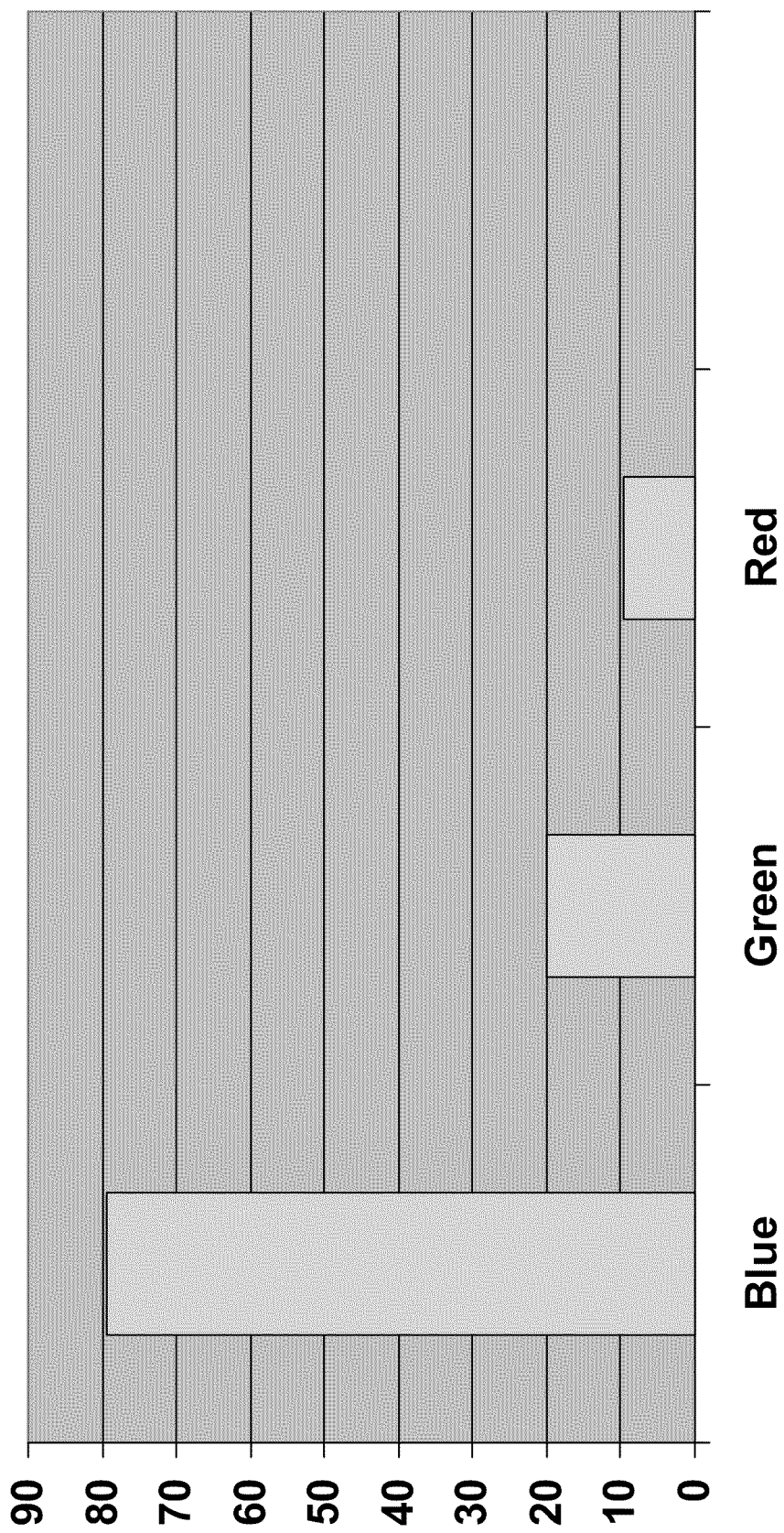
FIG. 4 is a graph showing color intensities of another pixel according to the RGB color scheme to illustrate a pixel having a high color potential in RGB.

Reference is now made to FIGS. 3 and 4, which are two graphs showing RGB color intensities at two different pixels. In FIG. 3 blue and green intensities are approximately equal with red being considerably less. In FIG. 4, the blue potential dominates both the green and the red. The color in FIG. 4 is said to have a high keying potential, a high purity of its dominant color. In fact the color's keying potential is the dominant color component minus the second color component which is 80−20=60%. Such colors are unnatural and are likely to have been chosen as the chroma background color which was intended to disappear. The color indicated in FIG. 3 looks fairly natural from the RGB point of view and the color's keying potential is 80−70=10%, fairly low. However note that actually the very low red reading is also an indicator that the color is unnatural and our color potential calculation has failed to take this into account. In fact we can convert the point into CMY color coordinates and work the color potential out in the normal way but since CMY colors are complementary to the RGB colors we do not need to do so. Actually the CMY keying potential is given by green−red=70−

10=60%, so our suspicion is confirmed and this color is as unnatural as the first. It is indeed a poor blue but it is a good cyan.

The prior art carries out keying by calculating a ratio between the foreground color potential (that of the actual pixel) and the background potential (that of the required background color) and differentiated not from the true key color, but from the closest pure component (R, G or B) at the loss of the keying potential equal to the difference between the true color and the key component.

Thus, if the potential is Green-Blue, then the more cyan the key color is (cyan is green and blue together) the more the blue component will diminish the green potential.

The present embodiments calculate two keying ratios, one based on the RGB color potential, and the second based on the CMY color potential and then interpolate between them to provide a final keying ratio corresponding to the full difference from the true key color rather than a nearest diminished value of the nearest component. Such an operation may be regarded as an interpolation between two keying operations, or double keying.

To return to the FIG. 3 example, The RGB color potential is 10% and the CMY color potential is 60%.

Figure 5:
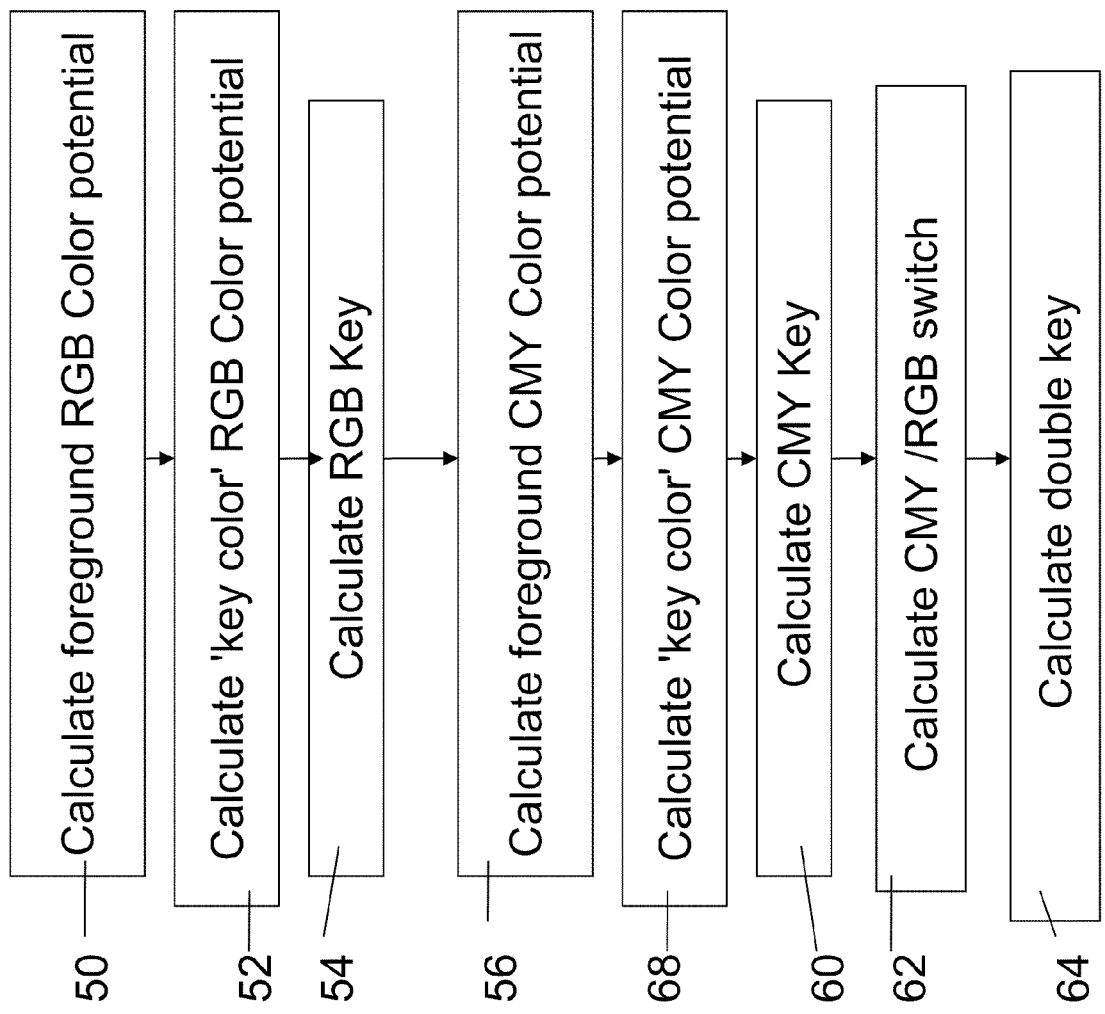
FIG. 5 is a simplified flow chart showing the two-key or double keying operation according to an embodiment of the present invention.

Reference is now made to FIG. 5 which is a simplified flow chart showing the double keying operation. We firstly calculate the foreground color potential 50 and the background color potential 52 and from these obtain an RGB keying ratio of foreground RGB potential over background RGB potential 54. Let us denote this $\alpha 1$.

Now we calculate a foreground CMY potential 56, a background CMY potential 58, and a CMY keying ratio of foreground CMY potential over background CMY potential 60. Let us denote this $\alpha 2$.

Next in box 62 we calculate an interpolation ratio, the CMY/RGB switch, from the background color as follows:

(Backmid−backmin)/(Backmax−backmin) which is a ratio of the proximity of the key color to RGB or CMY. A result of 1 would be a pure CMY color and a result of 0 would be a pure RGB color. The reason we determine the switch using the key color or background color is because that is most likely the color the object was shot against, and is therefore best differentiated from that color. Hence, the rest of the process should rely on that RGB/CMY ratio. In the case of FIG. 3, Blue is the maximum intensity, green is the mid intensity and red is the minimum intensity so the ratio would be (70−10)/(80−10)=0.857.

As expected our result tells us we are much closer to a pure CMY color than to a pure RGB color.

In box 64 we calculate the final keying value, which is now $\alpha 1(1-\text{switch})+\alpha 2 \cdot \text{switch}$.

The double keying may be applied to a traditionally obtained background color or may be applied to the interpolation-obtained background color of the present embodiments.

Reference is now made to FIG. 6 which is a simplified flow chart showing the two interpolations together. In box 70 a user selects background points. Of course it will be appreciated that the same process can be used for spill reduction and the user would select spill points.

Then in box 72 a loop begins for each pixel in the image. In box 74 the background color is interpolated as described above with FIG. 2. An influence of each user defined background point is calculated for the current pixel and an interpolated background color is calculated based on all the points. Then in boxes 76 and 78 the foreground color and key color potentials are calculated for each of the two color coordinate systems and a keying factor is calculated for each. Then a switch factor is calculated and used to provide an interpolation between the two keying factors. The final interpolation provides the transparency/opacity ratio to the pixel.

The process of FIG. 6 is simply applied to all the pixels in the image to remove background. The process is repeated with minor modification for spill suppression, in that interpolations are also used for spill suppression.

The following discussion shows a generalized version of the formula, to take into account user set amplification, and to generalize for more sample points. The result can be used for background keying and spill suppression.

Stage 1:

In stage one, we compare only one point against one another point. (pA and pB).

In order to compare more than two points one simply iterates through the formula again and again, each time replacing pA and pB with p1, p2, p3, p4 ... so, in accordance with the three point diagram of FIG. 2, we may assume the following:

pA is our currently "checked out" point.
pB is the point pA is "checked against".
when repeating the formula, pA will remain the same and pB will change to any other point so pA will be checked against all others.
only when this process is done will pA change to the next point which will, in turn, be checked against all other points.

Thus:
the value of 'A' will ALWAYS be the distance between the "checked out" point and the current pixel.
the value of 'B' will ALWAYS be the distance between the "checked against" point and the current pixel.
the value of 'C' is the distance between the two current points.

pAamp and pBamp refer to the user set amplification factor of each point. The amplification factor is used when the user wants to change the size of area over which a point is dominant. By default all points have an amplification value of 1, so that their coverage is determined only by their dispersion over the image. However the user can change this value if the effects seem useful to him. The amplification value can be anything from 0 and up, but should not be a negative value. A point with an amplification value of 0 is effectively invisible, and in practice is skipped by the algorithm to avoid division by 0.

As we said earlier, pA will begin as p1, and with each repetition pB will change from p2 to p3 to p4 ... (all points except p1)

The loop begins with pAinf=pAamp. This means that if the user has amplified a point's influence 5 times then our initial influence for that point at each pixel is 5. Having pBamp in the equation allows us to white-in the user set amplification of the other points in our calculation.

$$\text{temp1}=(((B-A)/C+1)/pB\text{amp}$$

$$\text{temp2}=(((A-B)/C+1)*pB\text{amp}$$

$$\text{temp3}=\text{temp1}*(2-\text{temp2})/2$$

temp3 now carries a 0 to 1 value telling us how powerful pA is over pB at the current pixel.
a value of 1 means that pA is unaffected by pB at the current pixel.
a value of 0 means that pA is completely overpowered by pB at the current pixel.

To tell how powerful a point is at a given pixel, we need to tell the "accumulative damage" that a point suffers from all other points. To achieve that, we multiply the result of this formula with the previous "accumulated" result.

$$pA\text{inf(new value)}=pA\text{inf(previous value)}*\text{temp3}$$

The multiplication is repeated iteratively until pA has been compared with all other points, by which time pAinf will have the full accumulated influence of p1.

We store the resulting value with p1 itself, thus: p1$inf$=pAinf (bearing in mind that pA is a variable holding a different point each time).

Now we start fresh with pA representing p2, and pB representing p1, p3, p4 . . . (all points except p2).

Stage 2.

p1$inf$, p2$inf$, p3$inf$ . . . now contain values setting their influence at the current pixel.

These values may be any positive values, for example 0.03, or 26.

However the value does not tell us the percentage of power of each point at a given pixel, since each point needs to share its influence with the other points. to convert these values to useful ratios we therefore sum up the values and divide each value by that sum, thus giving us a total of 1, with each value being, and thus each point providing, a proportional part of 1.

$$\text{sum}=p1\text{inf}+p2\text{inf}+p3\text{inf}\ldots$$

$$p1\text{inf}=p1\text{inf}/\text{sum}$$

$$p2\text{inf}=p2\text{inf}/\text{sum}$$

$$p3\text{inf}=p3\text{inf}/\text{sum etc.}$$

Stage 3.

These values may now be used for the mixing of all the different keying attributes that share these points in common. Thus:

$$p1\text{red}*p1\text{inf}+p2\text{red}*p2\text{inf}+p3\text{red}*p3\text{inf}\ldots$$

$$p1\text{green}*p1\text{inf}+p2\text{green}*p2\text{inf}+p3\text{green}*p3\text{inf}\ldots$$

etc . . .

Multiple Keying

In the above, a double keying process was described, in which two color spaces were taken, and a check was made as to where between the pure forms of the two spaces the current key color was. The ratio of color purity between the two spaces was then used to later blend the keying results of the two color spaces. The two color spaces used were RGB for which color coordinates are generally provided, and CMY which is complementary to RGB so that no actual color space coordinates have to be calculated.

However, for improved quality, keying could be done with any number of color spaces or keying methods, and they do not have to be complementary. As long as there is a method of telling the keying potential of a color in a color space, that color space can be added to the computation. Such would be useful for cinema—quality production, where computing power and real time results are less of an issue.

the formula as given above is simply expanded for the additional color spaces as follows:

1. the potential of each space or method is calculated.
2. the keying result for each space or method is calculated..
3. sum=potential1+potential2+potential3 . . .
4. final result=(result1*potential1+result2*potential2+result3*potential3 . . . )/sum.

The result is any number of different-color-spaces-based-keying into one optimal result, by ensuring that the best suited color spaces for the given pixel are given the most significant weight, based on the potential of each color space.

A preferred implementation for cinema—quality results may include 4 or 5 spaces together.

Keying involves Attributes other than Color

Most of the above has been described in terms of color as the keyed attribute. However keying is in no way limited to color. The two basic attributes that all keyers use are: key color and range (tolerance, softness etc), and the present method of keying, like most others, picks a color, for example green, as a keying definition and keys out pixels that are more green than the definition. Now, on darker regions of the frame, say where light fades or the actor casts a shadow, the pixels get more and more opaque. The increasing opaqueness in this shadow area often results in low opacity noise or dirt remaining in the matte.

The easiest way to get rid of such noise is to get rid of these low opacity values. However this can only be done at the expense of losing legitimate data of the same opacity values as the problem pixels. Common names for controls that get rid of such low opacity pixels are: low threshold, black clipping, or tolerance controls.

At the other end of the opacity scale we have the opposite problem. That is some pixels remain semi transparent when they ought to be opaque. This may for example occur when a green eyed actor uses a green screen. It may also occur when say a white shirt gets a greenish tint because of bouncing light in the studio.

The tinge tends to leave the matte a little transparent at times in areas such as white clothing which obviously should be completely opaque. The problem may be dealt with by condensing the opaqueness range, so that such partial and need-to-be-full values are swallowed into the high end of the range. However this is done at the expense of losing legitimate semi-transparent pixels, say from a window, that are now more opaque than they would have been ideally.

The common names for controls for such an operation are: high threshold, white clipping, softness etc.

Now, since compromising with the tolerance and softness causes a loss in the entire frame, the frame may be interpolated in accordance with the present embodiments. In this way the above problems can be confined to a smallest possible area.

So a larger, but by no means exhaustive, list of attributes for interpolation is as follows:

Color Sample Points:
red, green, blue.
Key Control Points:
tolerance, softness, dynamics, input offsets: red, green, blue.
Spill Control Points:
amount, mix, range, saturation, hue, lightness, colorize amount, colorize: red, green, blue.

Other possible attributes include pre and post processes such as: input offsets, pre-blur, post blur, choke, and erode. All of these are attributes that can be interpolated in accordance with the present embodiments, with varying degrees of importance.

Thus color sample points are placed on the background, regardless of where the object is, and the user places them at the beginning or end of light gradations on the chroma screen. Key points for that matter are of most use close to the object's edge, whether inside or outside thereof, and and spill points belong within the object.

Any point in the interface may in principle control all of the above attributes, but as a default they are separated for the sake of placement ease, and the interpolation mechanism of the present embodiments only compares points of the same kind, as points of different kind do not affect each other.

In other respects however interpolations of different attribute groups are identical interpolation processes.

Dispersion Algorithm in Computer Graphics in General

In computer graphics in general there are examples where interpolation in accordance with the above embodiments are useful. The following are examples where color gradients or ramps are generated for purposes other than keying.

These methods either use two points, and spread the two colors between them, or multiple points (typically 4), with a radius setting that disperses each point's color equally in all directions fading towards increasing radius. The fading is irrespective of the distance between the various points.

Using the above dispersion algorithm allows for the creating of any number of points, all of which interactively define a proportional space between the other points. As a further example, when processing an image from whatever cause (color correction, blurring, etc) one might want to provide different settings to different parts of the frame. Again, the method of the present embodiments allows settings to vary gradually over the frame, in preference to the prior art tendency to deal with the issue by defining two or more absolute regions, with all the disadvantages discussed hereinabove.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Apparatus for processing of an image, the apparatus comprising:
a pixel input configured for handling pixels of said image, the pixel defining a local property;
a reference input configured for user interactive definition of reference points;
an interpolation unit associated with said pixel input, configured for applying an interpolation of attributes at a respective pixel based on said reference points; and
a property assigner configured to compare a local property with said interpolation to apply a function to said local pixel based on said comparison using the said interpolated attributes, thereby to modify said local pixel, wherein said function is keying, said image comprising a foreground, said foreground comprising an object and a surrounding part to be removed, said reference points being sample points of said background to be removed and said function comprising assigning a level of opaqueness to said local pixel based on said comparison, thereby to remove the part from the image, wherein said reference input comprises a user setting unit for allowing a user to define said part to remove by identifying points thereon, said interpolation comprising providing a local set of keying attributes to correspond to said respective pixel, said local background color being an interpolation obtained from the colors at the identified points by weighting of their distances to said respective pixel, said distances being geometric distances.

2. Apparatus according to claim 1, wherein the part to remove is a chroma background part.

3. Apparatus according to claim 1, wherein said interpolation comprises interpolation of said part to remove, said local color being compared with said interpolation in said keying operation to set said opaqueness.

4. Apparatus according to 1, wherein said interpolation further comprises an interpolation between first and second color potentials of each of said local color and a local background color defined by said interpolation between reference points, each of said first and second color potentials calculated for a respective color encoding scheme, said interpolation of color potentials being provided to said opaqueness assigner for said keying operation.

5. Apparatus according to claim 4, configured with a color potential calculation unit to calculate the second color potential from the color values of the first color encoding scheme.

6. Apparatus according to claim 5, wherein said first color encoding scheme is the red, green blue (RGB) color scheme, and said second color encoding scheme is the cyan magenta yellow (CMY) color encoding scheme.

7. Apparatus for processing of an image, the apparatus comprising:
a pixel input configured for handling pixels of said image, the pixel defining a local property;
a reference input configured for user interactive definition of reference points;
an interpolation unit associated with said pixel input, configured for applying an interpolation of attributes at a respective pixel based on said reference points; and a property assigner configured to compare a local property with said interpolation to apply a function to said local pixel based on said comparison using the said interpolated attributes, thereby to modify said local pixel, wherein said function is keying, said image comprising a foreground, said foreground comprising an object and a surrounding part to be removed, said reference points being sample points of said background to be removed and said function comprising assigning a level of opaqueness to said local pixel based on said comparison, thereby to remove the part from the image, wherein said interpolation comprises an interpolation between first and second color potentials of each of said local color and a local background color defined by said interpolation between said reference points, each color potential calculated for a respective color encoding scheme, said interpolation of color potentials being provided to said opaqueness assigner for said comparison.

8. Apparatus according to claim 7, configured with a color potential calculation unit, wherein the second color potential is calculated from the color values of the first color encoding scheme, thereby obviating a need to convert color values between said first and said second color encoding schemes.

9. Apparatus according to claim 8, wherein said first color encoding scheme is the red, green blue (RGB) color scheme, and said second color encoding scheme is the cyan magenta yellow (CMY) color encoding scheme.

10. Method for chroma keying of an image comprising a foreground, the foreground including a part to remove, the method comprising:
obtaining individual pixels of said image, said pixels each defining a local color;
applying an interpolation at a respective pixel;
comparing the local color with the part to remove, using the interpolation, and
assigning to the respective pixel a level of opaqueness based on said comparison, thereby to remove the part;
allowing a user to define said part to remove by manually identifying points of said part to remove; and wherein said local interpolation comprises obtaining a local background color to correspond to said pixel, said local background color being an interpolation of the colors at the manually defined points weighted by their distances to said pixel, wherein said interpolation comprises a local interpolation of a color of said part to remove, said local color being compared with said local interpolation by said opaqueness assigner, and wherein said interpolation further comprises an interpolation between first and second color potentials of said local color, each of said first and second color potentials calculated for a respective color encoding scheme, said interpolation of color potentials being compared with said interpolated background color.

11. Method according to claim 10, wherein the second color potential is calculated from the color values of the first color encoding scheme, thereby obviating a need to convert color values between said first and said second color encoding schemes.

12. Method according to claim 11, wherein said first color encoding scheme is the red, green blue (RGB) color scheme, and said second color encoding scheme is the cyan magenta yellow (CMY) color encoding scheme.

13. Method for chroma keying of an image comprising a foreground, the foreground including a part to remove, the method comprising:
obtaining individual pixels of said image, said pixels each defining a local color:
applying an interpolation at a respective pixel;
comparing the local color with the part to remove, using the interpolation, and
assigning to the respective pixel a level of opaqueness based on said comparison, thereby to remove the part, wherein said interpolation comprises an interpolation between first and second color potentials of each of said local color and a color of said part to remove respectively, each color potential calculated for a respective color encoding scheme, said interpolation of color potentials being provided to said opaqueness assigner.

14. Method according to claim 13, wherein the second color potential is calculated from the color values of the first color encoding scheme, thereby obviating a need to convert color values between said first and said second color encoding schemes.

15. Method according to claim 14, wherein said first color encoding scheme is the red, green blue (RGB) color scheme, and said second color encoding scheme is the cyan magenta yellow (CMY) color encoding scheme.

* * * * *